Patented Dec. 8, 1942

2,304,637

UNITED STATES PATENT OFFICE 2,304,637

RESINOUS ANION EXCHANGE MATERIAL

Vernal Richard Hardy, Wilmington, Del., assignor to E. I. du Pont de Nemours & Company, Wilmington, Del., a corporation of Delaware No Drawing. Application November 30, 1939, Serial No. 306,967

10 Claims. (Cl. 260—80)

This invention relates to water-insoluble synthetic resinous materials and more particularly to water-insoluble, basic, nitrogen-containing, synthetic resinous materials having anion exchange properties.

This invention has as an object the provision of new resinous materials. A further object is the provision of new anion exchange materials. A further object is the provision of a process for preparing these materials. Other objects will appear hereinafter.

These objects are accomplished by the following invention wherein water-insoluble anion exchange materials are obtained by reacting, under non-hydrolyzing conditions, a halogen-containing aliphatic organic polymer which is resistant to the loss of halogen under saponification conditions and any resinous saponification products of which are free from alcoholic hydroxyl, with an acyclic ammonia-type organic compound having at least two hydrogen atoms on ammonia-type nitrogen atoms, in amount at least equivalent to the halogen present, i. e., in amount such that there is at least one ammonia-type nitrogen atom for each halogen atom present in the reaction mixture, until a water-insoluble resin is obtained, and an appreciable portion, preferably at least one per cent or more of the halogen atoms is replaced by nitrogen atoms.

In the process of the present invention, the acyclic, aliphatic, halogen-containing polymer is reacted under non-hydrolyzing conditions, i. e., under conditions such that, in the absence of the ammonia-type compound, the halogen containing compound would not be appreciably hydrolyzed, at a temperature between 30° and 350° C., and preferably between about 45° C. and 270° C., with an acyclic, ammonia-type compound having at least two hydrogen atoms attached to ammonia-type, i. e., basic nitrogen, in amount such that there is at least one hydrogen-bearing ammonia-type nitrogen atom for each halogen atom in the reaction mixture, heating being continued until at least 1% of the halogen atoms is replaced by nitrogen.

By ammonia type nitrogen is meant basic, tervalent nitrogen, all of whose valences are attached to hydrogen or carbon.

In a preferred modification of the invention, the acyclic ammonia-type compound is so selected that it contains a plurality of hydrogen-bearing nitrogen atoms separated by a chain of at least six contiguous carbon atoms. There may also be present in the reaction mixture other materials, such as caustic as an acid acceptor, or cupric chloride or potassium iodide as a catalyst. Still other alternative procedures are disclosed hereinafter. The products of this invention are resins containing nitrogen in the amine state, said resins being substantially insoluble in all common solvents. In particular, the resins are insoluble in water at 25° C., in dilute acid, i. e., in 5% aqueous acetic acid, and in dilute alkali, i. e., 5% aqueous sodium hydroxide.

The more detailed practice of the invention is illustrated by the following examples, wherein parts given are by weight. There are of course many forms of the invention other than these specific embodiments.

*Example I*

An aliphatic halogen-containing polymer suitable for the preparation of insoluble basic resins is prepared by the chlorination of polymethyl methacrylate in the following way. Fifty-one parts of polymethyl methacrylate is dissolved in 761 parts of tetrachlorethane and one part of bromine. Chlorine is passed through the clear viscous solution thus obtained at a temperature of about 95° C. until the increase in weight amounts to 26 parts. This requires about 3 hours. The resulting solution is evaporated to dryness in a vacuum oven, yielding a clear colorless resin (49 parts) which contains 27.58% chlorine and which under saponification conditions, i. e., the action of an excess of caustic in alcoholic solution at 25° C. for 30 minutes loses methanol, and yields a polymer essentially free from alcoholic hydroxyl groups. The chlorine content corresponds approximately to the substitution of one chlorine atom per structural unit of the polymer.

Twelve parts of chlorinated polymethyl methacrylate thus prepared and 100 parts of anhydrous liquid ammonia at its boiling point, about —33° C., are placed in an autoclave capable of withstanding the pressures built up by anhydrous ammonia at elevated temperatures. The autoclave is hermetically sealed and heated at 50° C. for 84 hours when, on examination of the product, it is found that at least 34% of the halogen atoms originally present have been replaced by nitrogen atoms. After the vessel is cooled, ammonia is allowed to evaporate. The remaining contents consist of a buff colored granular solid (9 parts) which is purified by thorough washing with water and is allowed to dry in the air. Ultimate analysis indicates that the resin contains 7.37% chlorine and 3.90% nitrogen. It is insoluble in all common organic solvents, including alcohols, ketones, esters, aliphatic and aromatic hydrocarbons, pyridine, dioxane, tetrachloroethane and mixtures thereof. The resin is softened by glacial acetic acid but is not soluble therein. It is also insoluble in water at 25° C., 1.5% acetic acid, 3% formic acid, and 10% sodium hydroxide. It is substantially insoluble in concentrated $H_2SO_4$. The resin is capable of absorbing acid from aqueous solution.

Example II

Twenty-five parts of polyvinyl chloride (alpha polymer), 65 parts of anhydrous ammonia, one part of potassium bromide, and one part of cupric chloride are placed in an autoclave having a capacity such that the above reactants fill it to about 50% of its capacity and heated at 150° C. for 12 hours, thereby replacing about 4.5% of the chlorine atoms originally present by nitrogen atoms. After the unreacted ammonia evaprates, the product is obtained as spherical aggregates possessing the color and appearance of cork. The material is pulverized by passage in the wet state through a grinder, washed with water, purified by digesting at 90° C. with 4% sodium hydroxide for 2 hours, further washed with water until the filtrate is neutral to phenolphthalein, and dried. The dried resinous reaction product amounts to 13 parts and is capable of absorbing acid from aqueous solution although it is wholly insoluble in acidic as well as in basic aqueous solutions. For example, the resin absorbs more than 3% of its weight of sulfuric acid from a 1/300 molar solution percolated through it, i. e., the resin has the properties of a base whose neutral equivalent is at most 1360. The resin is completely insoluble in all organic solvents and combinations thereof.

Example III

Thirty parts of polyvinyl chloride (alpha polymer) and 15 parts of ethylenediamine are heated in an autoclave at 90° C. for 10 hours, thereby replacing about 2.2% of the chlorine atoms by basic nitrogen atoms. The product (26 parts, dry weight) is purified as in Example II and is found to be a dark brown insoluble solid which is able to absorb acids from aqueous solutions, to an extent corresponding to a neutral equivalent of 2860.

Example IV

In the preparation of an aliphatic halogen-containing polymer suitable for conversion to a basic resin, a current of gaseous chlorine is passed through a solution of 100 parts of polythene (highly polymerized ethylene) prepared as in U. S. P. 2,153,553, issued to Faucett, Gibson and Perrin, in 797 parts of carbon tetrachloride at a temperature of 80° C. for 12 hours. The chlorinated product is substantially unaffected when subjected to saponifying conditions. The solvent is evaporated from this reaction product by heating it in an oven at 100° C. for 2 days. The dried product is a dark brown, rubbery material (108.5 parts) which contains 25.65% chlorine.

Fifteen parts of pulverized chlorinated polythene, prepared as described above, and 20 parts of hexamethylenediamine are heated together under reflux at temperatures varying from 220 to 260° C. for 65 hours, thereby replacing about 35% of the chlorine atoms by basic nitrogen atoms. After purifying and drying the solid product (20.6 parts) as described in the foregoing examples, it is a yellow granular material which is able to absorb from 1/300 molar sulfuric acid solution sufficient acid to indicate for the resin a neutral equivalent of 410.

In the foregoing examples, a number of aliphatic, halogen-containing polymers and acyclic ammonia-type compounds have been disclosed which react, under suitable conditions, to form insoluble resins. Anion-exchange resins, insoluble in water, dilute acid and dilute alkali, are obtained when any aliphatic halogen-containing polymer resistant to loss of halogen on saponification, i. e., which loses not more than one per cent of its halogen content when heated in ten times its weight of methanol containing its weight of sodium hydroxide for 30 min. at 25° C., any resinous saponification product of which is substantially free from alcoholic hydroxyl groups is reacted at a temperature between 30° and 350° C. and preferably between 45° C. and 270° C. with at least an equivalent amount of any acyclic ammonia-type nitrogen compound in which the nitrogen is basic, tervalent and attached only to hydrogen and/or carbon and in which there are at least two, but preferably more than two, hydrogen atoms attached to ammonia-type nitrogen. These may all be attached to a single nitrogen atom as is the case when ammonia or methylamine is used, or they may be distributed between two or more nitrogen atoms in the organic molecule, i. e., they may be supplied by two or more primary amino groups, by two or more secondary amino groups, or by one or more primary amino groups and one or more secondary amino groups. There may be present, in addition, ammonia-type nitrogen groups bearing no hydrogen atoms, such as tertiary amine groups or quaternary ammonium groups. As examples of acyclic ammonia-type compounds which may be advantageously employed in this invention there may be mentioned diethylenetriamine, triethylenetetramine, propylenediamine, N-methylhexamethylenediamine, N,N'-dimethylhexamethylenediamine, bis(N - methylaminoethyl) amine, tris(beta-aminotheyl)amine, bis(hexamethylene)triamine, decamethylenediamine, and bis-deca-methylenetriamine. As examples of suitable halogen-containing polymers, there may be mentioned unsymmetrical dichloroethylene polymer, vinyl chloride-vinyl acetate interpolymer, vinyl chloride emulsion polymer, chlorinated rubber, chlorinated polyvinyl chloride, polychloroprene and chlorinated polychloroprene.

Mixtures of two or more ammonia-type compounds and mixtures of two or more halogen-containing polymers may also be employed.

The proportion of ammonia-type compound to halogen-containing compound, in the absence of other bases, must be such that there is present at least one ammonia-type nitrogen atom for each halogen atom reacted, but in general it is convenient and unobjectionable to use the ammonia-type compound in large excess. In the appended claims, the phrase "equivalent amount" of the ammonia-type compound is used to designate an amount of the ammonia-type compound such that there is one hydrogen-bearing ammonia-type nitrogen atom for each halogen atom in the reaction mixture.

There may also be present in the reaction mixture an acid acceptor. Suitable acid acceptors include basic metallic oxides and hydroxides, e. g., calcium oxide, sodium hydroxide and organic bases such as dimethylaniline, pyridine or quinoline. When such bases are employed, the relative amount of ammonia-type compound can be diminished proportionately. It is also often preferable, though not essential, to include a catalyst among which, in addition to the cupric chloride and potassium bromide employed in the examples, metallic iodides such as calcium iodide or potassium iodide are especially useful. It is further within the scope of this invention to employ mixtures containing diluents, i. e., materials which do not enter into the reaction but allow it to proceed more smoothly or completely. Examples of such diluents are benzene, dioxane, and ethanol.

The reaction is conducted at a temperature sufficiently high to effect an appreciably rapid reaction and yet below the charring temperature of the ingredients employed. While the reaction which results in a basic insoluble resin, namely the replacement in the halogen-containing aliphatic polymer of organically bound halogen by organically bound basic nitrogen, may proceed in some cases at a measurable rate even at temperatures as low as 0° C., for practical purposes, a temperature of 30° C. and preferably 45° C. or above is desirable to achieve the effective extent of reaction in a reasonable length of time. The maximum operable temperature is that at which the ingredients char, i. e., at which may occur predominantly side reactions resulting in the loss of halogen from the aforementioned polymer without its replacement by organically bound nitrogen. This maximum temperature depends upon the nature of the particular ingredients chosen but for most materials is about 350° C. The duration of the reaction is also subject to considerable variation. The replacement of even a very small quantity of organically bound halogen in the polymer with organically bound nitrogen results in a water- and dilute acid-insoluble resin of detectable basicity within the scope of this invention. A preferred resin, however, for the uses disclosed herein is one in which at least 1% or more of the organically bound halogen is replaced by organically bound nitrogen. With the more rapid rates of reaction characteristic of the higher operable temperatures of this invention, this extent of reaction may be obtained in a very short time, even as little as one minute. It is usually preferable to achieve more complete reaction by allowing a longer time, since the most economical resins are those possessing a relatively high proportion of organically bound nitrogen. Thus in 84 hours, 34% reaction is achieved (Example I) and a still longer time is operable. The rate of reaction, however, diminishes as the reaction becomes more nearly complete so that for practical purposes it is stopped when the introduction of organically bound nitrogen becomes impractically slow.

The reaction may be accomplished at subatmospheric, at atmospheric, or at superatmospheric pressures. For example, a pressure substantially less than atmospheric (viz., 1 lb./sq. in.) can be used with such a preferred reactant as hexamethylenediamine at temperatures below 100° C. without causing the reaction mixture to boil. On the other hand, it is not essential that the reactants be maintained in the liquid state. Thus, pressures insufficient to prevent total vaporization of ammonia are operative in this invention, or ammonia may be employed as one reactant at a temperature above its critical point (132.9° C.). The pressure developed by a reaction mixture containing anhydrous ammonia at 150° C. might properly be approximately 2000 lbs./sq. in.

The "non-hydrolyzing conditions" employed in this invention signify conditions under which the halogen-containing polymer is not appreciably hydrolyzed in the absence of the ammonia-type compound.

This invention is of particular value because of the insolubility and the ammonia-type nitrogen content of the reaction products, which make them eminently suitable as anion exchange resins, e. g., in the preparation of substantially electrolyte-free water or other liquids by complete removal of the anion content in conjunction with a cation exchanging resin used to remove cations, in the substitution of a harmless anion for an injurious one in preparing water suitable for special purposes, and in the preparation of water-soluble inorganic salts by an exchange of one type of anion present in the resin for another anion present in a solution in contact with the resin. The resins are also suitable as matrices for the preparation of organic pigments which may be accomplished by taking up a suitable dyestuff in an insoluble resin. Acidic impurities may be taken up from gases and non-aqueous liquids by a filter composed of an anion exchange resin.

In the process of the present invention a combination of materials old to the art but used in new proportions produces, under suitable reaction conditions, products having an unexpected and important property, i. e., insolubility, i. e., the use of ammonia-type compounds in amounts at least chemicallly equivalent to the aliphatic halogen-containing polymers employed results unexpectedly in insoluble reaction products.

The above description and examples are intended to be illustrative only. Any modification of or variation therefrom which conforms to the spirit of the invention is intended to be included within the scope of the claims.

What is claimed is:

1. Process which comprises reacting a solid resinous aliphatic acyclic halogen-containing polymer, resistant to loss of halogen under saponification conditions and any resinous saponification product of which is substantially free from alcoholic hydroxyl groups under non-hydrolyzing conditions at 30–350° C. with an acyclic ammonia-type nitrogen compound having at least two hydrogen atoms on ammonia-type nitrogen in amount such that there is at least one hydrogen-bearing, ammonia-type, nitrogen atom for each halogen atom present in the reaction mixture, until at least 1% of the halogen is replaced by ammonia-type nitrogen.

2. Process which comprises reacting a solid resinous aliphatic acyclic chlorine-containing polymer under non-hydrolyzing conditions at 30–350° C. with an acyclic ammonia-type nitrogen compound having at least two hydrogen atoms on ammonia-type nitrogen in amount such that there is at least one hydrogen-bearing, ammonia-type, nitrogen atom for each chlorine atom present in the reaction mixture, until at least 1% of the chlorine is replaced by ammonia-type nitrogen, said acyclic halogen-containing polymer being resistant to removal of halogen on saponification.

3. Process which comprises reacting a solid resinous aliphatic acyclic chlorine-containing polymer under non-hydrolyzing conditions at 30–350° C. with an acyclic organic compound having a plurality of hydrogen-bearing amino groups in amount such that there is at least one hydrogen-bearing, ammonia-type nitrogen atom for each chlorine atom present in the reaction mixture, until at least one percent of the chlorine is replaced by ammonia-type nitrogen, said acyclic halogen-containing polymer being resistant to removal of halogen on saponification and any resinous saponification product of which is substantially free from alcoholic hydroxyl groups.

4. Process which comprises reacting a solid resinous aliphatic acyclic chlorine-containing polymer under non-hydrolyzing conditions at 30–350° C. with an acyclic organic ompound having a plurality of hydrogen-bearing amino groups separated by a chain of at least six contiguous carbon atoms, in amount such that there is at least one hydrogen-bearing, ammonia-type nitrogen atom for each chlorine atom present in the reaction mixture until at least one percent of the chlorine is replaced by ammonia-type nitrogen, said acyclic halogen-containing polymer being resistant to removal of halogen on saponification and any resinous saponification product of which is substantially free from alcoholic hydroxyl groups.

5. Process which comprises reacting a solid resinous aliphatic acyclic chlorine-containing polymer under non-hydrolyzing conditions with hexamethylenediamine in amount such that there is at least one amino hydrogen for each chlorine atom in the polymer until at least one percent of chlorine is replaced by ammonia type nitrogen, said acyclic chlorine-containing polymer being resistant to removal of chlorine on saponification.

6. A basic, water insoluble, dilute acid insoluble, and dilute alkali insoluble, resinous reaction product of a solid resinous acyclic aliphatic halogen-containing polymer which is resistant to removal of halogen on saponification and, in amount such that there is at least one hydrogen-bearing, ammonia-type, nitrogen atom for each halogen atom present in the reaction mixture, an ammonia type acyclic nitrogen compound having at least two hydrogen atoms on ammonia-type nitrogen, said product having at least one percent of the original halogen of the polymer replaced by ammonia-type nitrogen.

7. A basic, water insoluble, dilute acid insoluble, and dilute alkali insoluble, resinous reaction product of a solid resinous acyclic aliphatic chlorine-containing polymer which is resistant to removal of halogen on saponification and, in amount such that there is at least one hydrogen-bearing, ammonia-type, nitrogen atom for each halogen atom present in the reaction mixture, an ammonia type acyclic nitrogen compound having at least two hydrogen atoms on ammonia-type nitrogen, said product having at least one percent of the original chlorine of the polymer replaced by ammonia-type nitrogen.

8. A basic, water insoluble, dilute acid insoluble, and dilute alkali insoluble, resinous reaction product of a solid resinous acyclic aliphatic chlorine-containing polymer which is resistant to removal of halogen on saponification and, in amount such that there is at least one hydrogen-bearing, ammonia-type, nitrogen atom for each halogen atom present in the reaction mixture, an acyclic organic compound having a plurality of hydrogen bearing amino groups, said product having at least one percent of the original chlorine of the polymer replaced by ammonia-type nitrogen.

9. A basic, water insoluble, dilute acid insoluble, and dilute alkali insoluble, resinous reaction product of a solid resinous acyclic aliphatic chlorine-containing polymer which is resistant to removal of halogen on saponification and, in amount such that there is at least one hydrogen-bearing, ammonia-type, nitrogen atom for each halogen atom present in the reaction mixture, an acyclic organic compound having a plurality of hydrogen bearing amino groups separated by a chain of at least six contiguous carbon atoms, said product having at least one percent of the original chlorine of the polymer replaced by ammonia-type nitrogen.

10. A basic, water insoluble; dilute acid insoluble, and dilute alkali insoluble, resinous reaction product of a solid resinous acyclic aliphatic chlorine-containing polymer which is resistant to removal of halogen on saponification and, in amount such that there is at least one hydrogen-bearing, ammonia-type, nitrogen atom for each halogen atom present in the reaction mixture, hexamethylenediamine, said product having at least one percent of the original chlorine of the polymer replaced by ammonia-type nitrogen.

VERNAL RICHARD HARDY.